United States Patent
Baartman et al.

(10) Patent No.: US 6,487,026 B2
(45) Date of Patent: Nov. 26, 2002

(54) OPTICAL LENS SYSTEM COMPRISING TWO MORE THAN HALF-SPHERICAL LENSES

(75) Inventors: Jan Peter Baartman, Eindhoven (NL); Bernardus Hendrikus Wilhelmus Hendriks, Eindhoven (NL); Johannes Theodorus Adrianus Van De Veerdonk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/814,655

(22) Filed: Mar. 22, 2001

(65) Prior Publication Data

US 2001/0038499 A1 Nov. 8, 2001

(30) Foreign Application Priority Data

Mar. 27, 2000 (EP) .............................. 00201098

(51) Int. Cl.$^7$ .............................. G02B 7/02; G11B 7/00
(52) U.S. Cl. .................... 359/808; 359/824; 369/112.2; 369/112.1
(58) Field of Search .................. 359/808, 823, 359/824, 819; 369/112.2, 112.1, 112.23, 112.03, 112.05, 112.06, 112.07

(56) References Cited

U.S. PATENT DOCUMENTS

| 5,175,783 A | * 12/1992 | Tatoh .......................... 385/93 |
| 6,307,689 B1 | * 10/2001 | Ichimura et al. ............ 359/823 |
| 2001/0053117 A1 | * 12/2001 | Ichimura et al. ....... 369/112.24 |

FOREIGN PATENT DOCUMENTS

| EP | 0863502 A2 | 9/1998 | ........... G11B/7/135 |
| WO | WO 01/73776 A1 | * 10/2001 | |

* cited by examiner

Primary Examiner—Georgia Epps
Assistant Examiner—Timothy J Thompson
(74) Attorney, Agent, or Firm—Michael E. Belk (57) ABSTRACT

An optical lens system including: a first lens including a more than half part of a substantially spherical first lens body having a first diameter and a substantially flat first boundary surface; a second lens including a more than half part of a substantially spherical second lens body having a second diameter and a substantially flat second boundary surface, the second diameter being smaller than the first diameter; and a lens holder comprising a first and a second mount for, respectively, the first and second lens, wherein the first an the second mounts comprise, respectively, a first and a second circular cylindrical inner wall having a common center line, a diameter of the first inner wall and a diameter of the second inner wall being substantially equal to, respectively, the first and the second diameters.

26 Claims, 3 Drawing Sheets

OPTICAL LENS SYSTEM COMPRISING TWO MORE THAN HALF-SPHERICAL LENSES

FIELD OF THE INVENTION

The invention relates to an optical lens, a method of manufacturing an optical lens system, an optical scanning device for scanning an information layer of an optically scannable information carrier, and a an optical player for scanning an information layer of an optically scannable information carrier.

BACKGROUND OF THE INVENTION

An optical player, an optical scanning device employed in the player, and an optical lens system used in the scanning device, of the types mentioned in the opening paragraphs are known from EP-A-0 863 502. The first lens of the known lens system is an objective lens, and the second lens is an auxiliary lens arranged between the objective lens and the information carrier to be scanned. By using the auxiliary lens, the known lens system has a comparatively large numerical aperture, as a result of which a relatively small scanning spot is formed on the information carrier to be scanned. The known scanning device can thus suitably be used to scan information carriers having comparatively small elementary information characteristics, i.e., information carriers having a comparatively high information density, such as a high-density CD. The first and the second lens are provided with ring-shaped flanges, each flange being manufactured in one piece with the associated lens body and provided with, respectively, a ring-shaped and a circular cylindrical positioning surface. The first mount of the lens holder includes a ring-shaped positioning surface, which extends perpendicularly to the centerline of the lens holder, and against which the ring-shaped positioning surface of the first lens abuts. The second mount of the lens holder also includes a ring-shaped positioning surface which extends perpendicularly to the center line and which surrounds the first lens and abuts against the positioning surface of the first mount, and a sleeve whose inner wall is concentrically arranged around the center line, the circular cylindrical positioning surface of the second lens being in contact with said inner wall. The optical axes of both lenses should coincide within predetermined comparatively close tolerances so as to make sure that a proper optical effect of both lenses is achieved. To this end, the optical axes, viewed in directions perpendicular to the centerline, must be accurately positioned with respect to each other and must extend accurately parallel to one another. In the manufacture of the known lens system, the positions of the optical axes relative to each other can be corrected in directions perpendicular to the center line by moving both mounts with respect to each other over their positioning surfaces. Parallelism of the optical axes is achieved by providing the ring-shaped positioning surface of the first lens at right angles to the optical axis of the first lens, and by providing the circular cylindrical positioning surface of the second lens so as to be concentric with respect to the optical axis of the second lens.

A drawback of the known lens system, the known optical scanning device and the known optical player resides in that the comparatively close tolerances within which the optical axes of the two lenses of the lens system must coincide are comparatively very difficult to achieve. This can be attributed to the fact that the provision with the desired accuracy of said positioning surfaces on the flanges of both lenses is a very laborious process.

SUMMARY OF THE INVENTION

It is an object of the invention to provide a lens system, an optical scanning device and an optical player of the types mentioned in the opening paragraphs, in which the comparatively close tolerances within which the optical axes of the two lenses of the lens system must coincide can be achieved in a less laborious way.

To achieve this object, a lens system in accordance with the invention is characterized in that the first and the second mount comprise, respectively, a first and a second circular cylindrical inner wall having a common center line, a diameter of the first inner wall and a diameter of the second inner wall being substantially equal to, respectively, the first and the second diameter, and the first and the second lens comprising more than one half of, respectively, the first and the second spherical lens body.

To achieve this object, an optical scanning device in accordance with the invention is characterized in that the lens system used therein is a lens system in accordance with the invention.

To achieve this object, an optical player in accordance with the invention is characterized in that the optical scanning device used therein is an optical scanning device in accordance with the invention.

As the diameters of said inner walls are substantially equal to, respectively, the first diameter of the first lens body and the second diameter of the second lens body, both lenses are accurately positioned in both mounts in directions perpendicular to the centerline. A very accurate mutual positioning of both lenses in directions perpendicular to the center line is achieved in that the diameters of said inner walls are accurately dimensioned and said inner walls are very accurately coaxial. This accuracy can be achieved in a manner which is not very laborious by providing the first and the second mount of the lens holder with, respectively, the first and the second circular cylindrical inner wall using conventional tools, such as a lathe. Also the spherical lens bodies can be very accurately manufactured using comparatively simple processes, such as rolling process. Since the first and the second lens comprise more than half the, respectively, first and second spherical lens body, both lens bodies, after having been positioned in the two mounts, can still be tilted through limited angles in both mounts around the center of the relevant lens body, without the mutual positions of the two lenses, viewed at right angles to the center line, being influenced, so that the accurate mutual positions of the two lenses, viewed at right angles to the center line, is not influenced when, at a later stage, the optical axes of the two lenses are adjusted so as to be parallel.

A particular embodiment of an optical lens system in accordance with the invention is characterized in that the first lens is bounded, on a side facing the second lens, by a boundary surface extending perpendicularly to the center line, while the first mount is provided with an abutting member for the boundary surface of the first lens, which abutting member extends in a plane perpendicular to the center line. Said boundary surface and said abutting member cause the optical axis of the first lens to be accurately situated parallel to the centerline of the lens holder. Said boundary surface only must be accurately flat, the optical axis of the first lens being formed by the diameter of the first lens body extending perpendicularly to the boundary surface. Said abutting member must be accurately provided so as to extend perpendicularly to the center line of the lens holder, which can be carried out in a manner which is not very laborious by using conventional tools, such as a lathe.

A further embodiment of an optical lens system in accordance with the invention is characterized in that the abutting member comprises a ring-shaped surface extending perpendicularly to the center line, which ring-shaped surface causes the first and the second inner wall to be connected to one another in a stepwise manner. In this embodiment, the abutting member is embodied in a manner which is both practical and not very labor-intensive.

Yet another embodiment of an optical lens system in accordance with the invention is characterized in that the second lens is bounded, on a side facing away from the first lens, by a boundary surface extending perpendicularly to the centerline. Said boundary surface only must be accurately flat, the optical axis of the second lens being formed by the diameter of the second lens body extending perpendicularly to the boundary surface. Since the boundary surface is provided on the side of the second lens facing away from the first lens, the boundary surface is accessible to an aligning tool in a manner which is not very laborious, which aligning tool serves to make sure that the optical axis of the second lens extends parallel to the center line of the lens holder.

A particular embodiment of an optical lens system in accordance with the invention is characterized in that the second mount is provided, on a side facing away from the first lens, with an end surface extending perpendicularly to the center line, the end surface and the boundary surface of the second lens being situated in a common plane. In this particular embodiment, said end surface is provided so as to extend perpendicularly to the center line of the lens holder, which can be achieved in a manner which is not very laborious by using conventional tools, such as a lathe. Parallelism of the optical axis of the second lens and the center line can be readily adjusted using aligning tools provided with a common aligning surface for said end surface and the boundary of the second lens.

A further embodiment of an optical lens system in accordance with the invention is characterized in that at least one of the two lenses is secured in the relevant mount by means of a glued joint. Said glued joint is very simple and can be provided, after the relevant lens has been aligned with respect to the relevant mount, without influencing said position of the relevant lens with respect to the relevant mount.

A still further embodiment of an optical lens system in accordance with the invention is characterized in that at least one of the lenses is secured in the relevant mount by press-fitting the relevant lens body in the relevant inner wall. In this manner, the relevant lens is secured in the relevant mount in a very simple and reliable manner.

A particular embodiment of an optical lens system in accordance with the invention is characterized in that the first and the second mount are substantially sleeve-shaped and connected to one another via a hollow conical center portion of the lens holder. The use of said conical center portion provides the lens holder with a very high rigidity and accuracy of form, viewed in a direction parallel to the centerline, so that the mutual positions of the two lenses are substantially uninfluenced by lens holder deformations.

A method of manufacturing an optical lens system in accordance with the invention is characterized in that the second lens is positioned in the second mount by supporting the boundary surface of the second lens by means of a first aligning surface of an aligning tool, and by simultaneously supporting the abutting member of the first mount by means of a second aligning surface of the aligning tool that is directed parallel to the first aligning surface. The abutting member of the first mount is intended for the boundary surface of the first lens and extends in a plane that is perpendicular to the centerline of the lens holder. By simultaneously supporting the boundary surface of the second lens and said abutting member by means of the two parallel aligning surfaces of the aligning tool, the optical axis of the second lens is accurately positioned parallel to the center line of the lens holder. By positioning, at a later stage, the boundary surface of the first lens so as to be in contact with said abutting member, also the optical axis of the first lens is accurately positioned parallel to the center line of the lens holder. In this manner, the optical axes of the two lenses are positioned parallel to the center line in a manner which is not very laborious by using said aligning tools. To achieve the desired parallel positions of the two lenses, the lens holder only has to be provided with a single, accurately provided abutting member.

A further method of manufacturing an optical lens system in accordance with the invention is characterized in that the second lens is positioned in the second mount by simultaneously supporting the boundary surface of the second lens and the end surface of the second mount by means of an aligning surface of an aligning tool. In this further method, the lens holder is provided with an abutting member for the boundary surface of the first lens, which abutting member extends perpendicularly to the center line, and with an end surface for cooperation with the aligning surface of the aligning tool, which end surface extends perpendicularly to the center line. The necessary aligning tool has to comprise only a single aligning surface and hence is of a very simple construction.

DESCRIPTION OF THE DRAWINGS

These and other aspects of the invention will be apparent from and elucidated with reference to the embodiment(s) described hereinafter.

In the drawings.

DETAILED DESCRIPTION OF THE INVENTION

Figure 1:
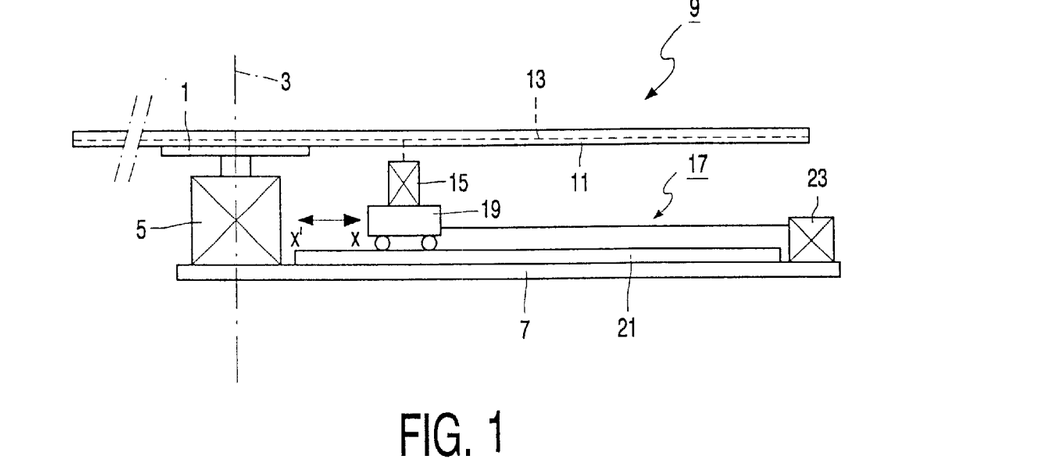
FIG. 1 diagrammatically shows an optical player in accordance with the invention, FIG. 2 diagrammatically shows an optical scanning device in accordance with the invention, which is used in the optical player shown in FIG. 1, FIG. 3 diagrammatically shows a sectional view of a first embodiment of a lens system in accordance with the invention, which can suitably be used in the scanning device shown in FIG. 2, FIG. 4 diagrammatically shows a sectional view of a second embodiment of a lens system in accordance with the invention, which can suitably be used in the scanning device shown in FIG. 2, FIG. 5 diagrammatically shows an aligning tool used in the manufacture of the lens system, shown in FIG. 4, in accordance with a method according to the invention, and FIG. 6 diagrammatically shows an aligning tool used in the manufacture of the lens system, shown in FIG. 4, in accordance with an alternative method according to the invention.

FIG. 1 diagrammatically shows an optical player in accordance with the invention, which comprises a table 1, which can be rotated about an axis of rotation 3 and driven by an electric motor 5, which is secured onto a frame 7. An optically scannable information carrier 9, such as a DVD, can be placed on the table 1, which information carrier is provided with a disc-shaped transparent substrate on which an information layer 13 having a spiral-shaped information track is present. The information layer 13 is covered with a transparent protective coating 11. The optical player further comprises an optical scanning device 15 in accordance with the invention for optically scanning the information track of the information carrier 9. By means of a displacement device 17 of the optical player, the scanning device 15 can be displaced with respect to the axis of rotation 3 mainly in two opposite radial directions X and X'. For this purpose, the scanning device 15 is secured to a slide 19 of the displacement device 17, which is further provided with a straight guide 21, over which the slide 19 is displaceably guided, which straight guide extends parallel to the X-direction and is provided on the frame 7, and with an electric motor 23 by means of which the slide 19 can be displaced over the guide 21. In operation, the motors 5 and 23 are controlled by an electrical control unit, not shown in the drawing, of the optical player, in such a manner that the resulting rotation of the information carrier 9 about the axis of rotation 3 and, simultaneously, the displacement of the scanning device 15 in a direction parallel to the X-direction take place in such a manner that the spiral-shaped information track present on the information carrier 9 is scanned by the scanning device 15. During scanning, information present on the information track can be read by the scanning device 15, or information can be written by the scanning device 15 on the information track.

Figure 2:
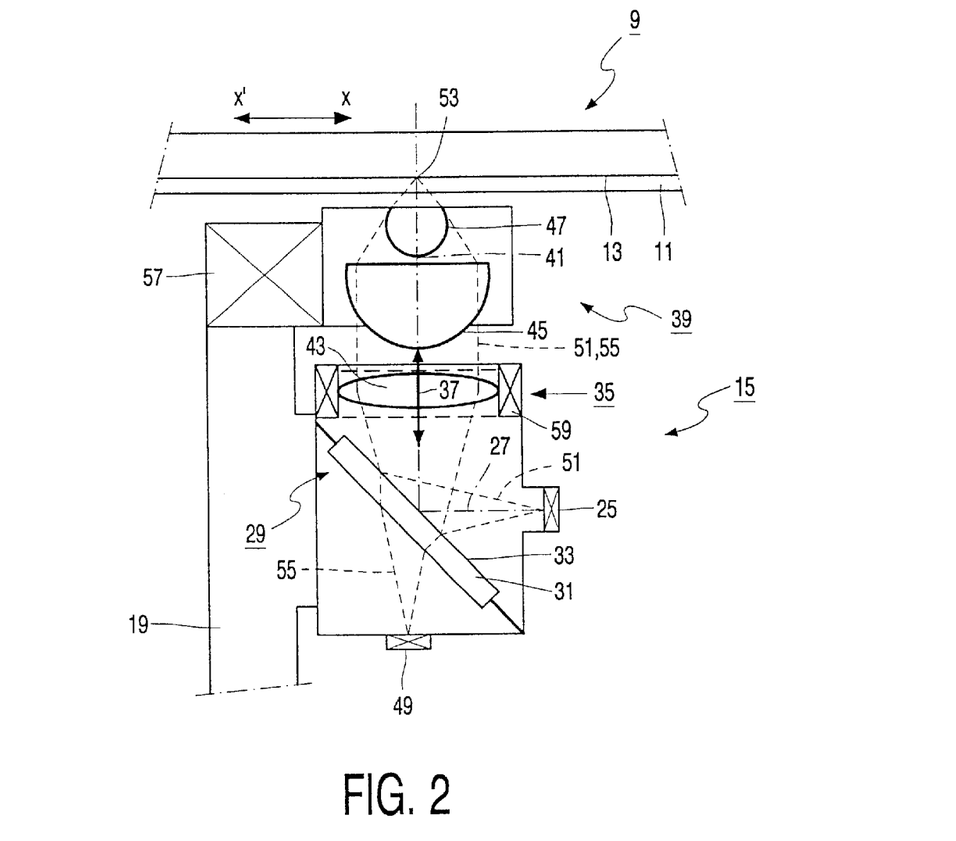

The optical scanning device 15 in accordance with the invention used in the optical player in accordance with the invention is diagrammatically shown in FIG. 2. The scanning device 15 is provided with a radiation source 25, such as a semiconductor laser with an optical axis 27. The scanning device 15 further comprises a radiation beam splitter 29 which comprises a transparent plate 31 having a reflecting surface 33 facing the radiation source 25, which transparent plate 31 is arranged at an angle of 45° with respect to the optical axis 27 of the radiation source 25. The scanning device 15 further includes a collimator lens unit 35 with an optical axis 37 and an optical lens system 39 in accordance with the invention with an optical axis 41, the collimator lens unit 35 being arranged between the radiation beam splitter 29 and the lens system 39. In the example shown, the collimator lens unit 35 comprises a single collimator lens 43, while the lens system 39 comprises a first or objective lens 45 and a second or auxiliary lens 47 arranged between the objective lens 45 and the information carrier 9. In the example shown, the optical axis 37 of the collimator lens unit 35 and the optical axis 41 of the lens system 39 coincide and include an angle of 90° with the optical axis 27 of the radiation source 25. The scanning device 15 further includes an optical detector 49 of a type which is known per se and commonly used, which optical detector is arranged, with respect to the collimator lens unit 35, behind the radiation beam splitter 29. In operation, the radiation source 25 generates a radiation beam 51, which is reflected by the reflective surface 33 of the radiation beam splitter 29 and focused by the lens system 39 to a scanning spot 53 on the information layer 13 of the information carrier 9. The radiation beam 51 is reflected by the information layer 13 so as to form a reflected radiation beam 55 which is focused, via the lens system 39, the collimator lens unit 35 and the radiation beam splitter 29, onto the optical detector 49. To read information present on the information carrier 9, the radiation source 25 generates a continuous radiation beam 51, and the optical detector 49 supplies a detection signal which corresponds to a series of elementary information characteristics on the information track of the information carrier 9, which elementary information characteristics are successively present in the scanning spot 53. To write information on the information carrier 9, the radiation source 25 generates a radiation beam 51 which corresponds to the information to be written, a series of successive elementary information characteristics on the information track of the information carrier 9 being generated in the scanning spot 53. It is to be noted that the invention also comprises optical scanning devices wherein the radiation source 25, the collimator lens unit 35 and the lens system 39 are arranged differently with respect to each other. For example, the invention comprises embodiments in which the optical axis 37 of the collimator lens unit 35 and the optical axis 41 of the lens system 39 include an angle of 90° with each other, and in which an additional mirror is arranged between the collimator lens unit 35 and the lens system 39. In these embodiments, the dimensions of the optical scanning device are reduced, viewed in a direction parallel to the optical axis 41 of the lens system 39. The invention also includes, for example, embodiments wherein the radiation source 25 and the collimator lens unit 35 are not arranged on the slide 19 but in a fixed position with respect to the frame 7, and wherein the optical axis 37 of the collimator lens unit 35 is directed parallel to the radial directions X, X'. In these embodiments, only the lens system 39 and an additional mirror are arranged on the slide 19, so that the displaceable mass of the slide 19 is reduced.

As is further shown in FIG. 2, the optical scanning device 15 comprises a first actuator 57 and a second actuator 59. By means of the first actuator 57, the lens system 39 can be displaced over comparatively small distances, parallel to the second optical axis 41, and over comparatively small distances parallel to the X-direction. By displacing the lens system 39 parallel to the optical axis 41 by means of the first actuator 57, the scanning spot 53 is focused with desired accuracy on the information layer 13 of the information carrier 9. By displacing the lens system 39, by means of the first actuator 57, in a direction parallel to the X-direction, the scanning spot 53 is maintained, with desired accuracy, on the information track to be followed. For this purpose, the first actuator 57 is controlled by said control unit of the optical player, which receives a focusing error signal as well as a tracking error signal from the optical detector 49. By means of the second actuator 59, the collimator lens 43 of the collimator lens unit 35 can be displaced over comparatively small distances in a direction parallel to the optical axis 37. By displacing the collimator lens 43 by means of the second actuator 59 in a direction parallel to the optical axis 37, spherical aberrations of the radiation beam 51 in the transparent protective coating 11 of the information carrier 9 are corrected. Such spherical aberrations are caused mainly by fluctuations in the thickness of the protective coating 11. For this purpose, the second actuator 59 is controlled, by means of an electric control current, by said control unit of the optical player, which receives an error signal from a sensor, not shown in the Figures, by means of which, for example, the thickness of the transparent protective coating 11 near the scanning spot 53 can be measured. The control unit is embodied so as to control the electric current through the second actuator 59 in such a manner that the collimator lens 43 can be placed in a position wherein said spherical aberration is corrected in a predetermined, customary manner that is known per se.

Figure 3:
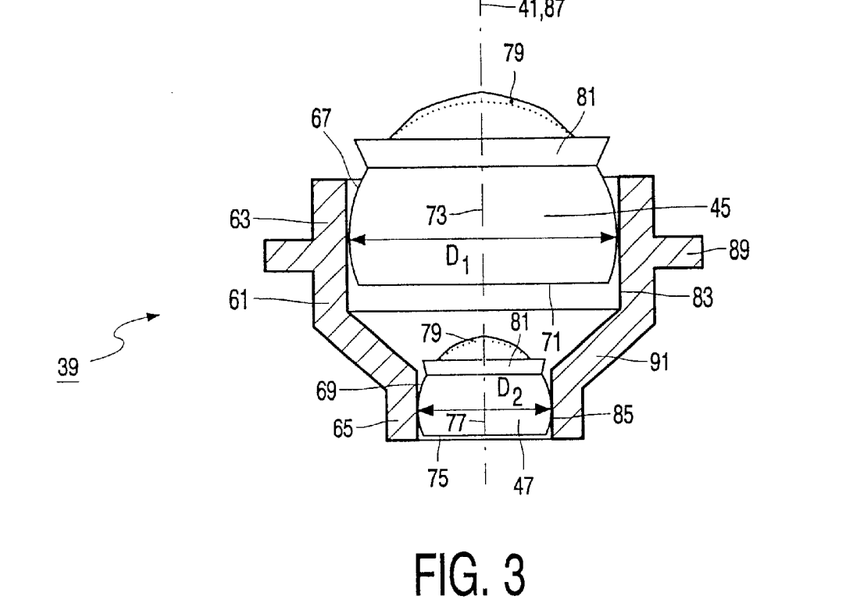

The optical lens system 39 in accordance with the invention is shown in detail in FIG. 3. Lens system 39 comprises a lens holder 61 having a first mount 63 for the first lens, also referred to as objective lens 45, and a second mount 65 for the second lens, also referred to as auxiliary lens 47. The objective lens 45 and the auxiliary lens 47 comprise a portion of, respectively, a substantially spherical first lens body 67 having a diameter $D_1$ and a substantially spherical second lens body 69 having a second diameter $D_2$ that is smaller than $D_1$. The first lens body 67 is provided with a boundary surface 71 on a side facing the auxiliary lens 47, so that an axial line of the first lens body 67 extending perpendicularly to the boundary surface 71 forms an optical axis 73 of the objective lens 45. The second lens body 69 is provided, on a side facing away from the objective lens 45, with a boundary surface 75, so that an axial line of the second lens body 69 extending perpendicularly the boundary surface 75 forms an optical axis 77 of the auxiliary lens 47. The two lens bodies 67 and 69 are provided, on the side facing away from the boundary surface 71, 75, with a lacquer coating 79, which is applied by means of a replica process which is known per se and commonly used, so that an aspherical lens surface is obtained. Reference numeral 81 denotes an excess of lacquer on the objective lens 45 and the auxiliary lens 47, which remains on the relevant lens body 67, 69 after the replica process.

A specific embodiment of the optical lens system 39 changes the parallel radiation beam 51 having a wavelength of 400 nm to a convergent beam having a numerical aperture (NA) of 0.85, which passes through the protective coating 11 of the information carrier 9 so as to form the scanning spot 53 on the information layer 13. The free working distance between the optical lens system 39 and the protective coating 11 is 0.15 mm, the thickness of the protective coating 11 being 0.1 mm and its refractive index n=1.624 at said wavelength of the radiation beam 51. The first lens 45 of the optical lens system 39 has a diameter of 4,14 mm, a thickness on the optical axis 73 of 2,319 mm and an entrance pupil diameter of 3,0 mm. The lens body 67 of the first lens 45 is made from Schott glass FK5 having a refractive index of 1,499. The convex surface of the first lens 45, which is directed towards the collimator lens 43, has a radius of curvature of 2.07 mm. The aspherical shape of the convex surface is obtained by applying a thin lacquer coating 79 of Diacryl to the first spherical lens body 67. The lacquer of the lacquer coating 79 has a refractive index of 1,595, and the thickness of the lacquer coating 79 on the optical axis 73 is 19 micrometers. The rotationally symmetrical aspherical shape is given by the equation $$z(r) = \sum_{i=1}^{8} A_{2i} r^{2i}$$

wherein z is the position of the surface in the direction of the optical axis 73 in millimeters, r is the distance to the optical axis 73 in millimeters, and $A_k$ is the coefficient of the $k^{th}$ power of r. The values of the coefficients $A_2$ through $A_{16}$ are, respectively, 0.2643886, 0.008869125, −3.3763645 $10^{-6}$, 0.0014305415, −0.0013369808, 0.0006112074, −0.00014547052 and 1.2928731 $10^{-5}$. The boundary surface 71 of the first lens 45 opposite the convex surface has a radius of curvature that is infinite. The second lens 47 of the optical lens system 39 has a diameter of 1.7 mm, a thickness on the optical axis 77 of 0.977 and the distance to the first lens 45 is 0.356 mm. The lens body 69 of the second lens 47 is also made from Schott glass FK 5. The convex surface of the second lens 47, which is directed towards the first lens 45, has a radius of curvature of 0.85 mm. The aspherical shape of the convex surface is given by the above equation, wherein the values of the coefficients $A_2$ through $A_{16}$ are, respectively, 0.6052026, 0.21991899, 0.12419616, 0.023176954, 0.15057964, 0.56573255, 1.2308544 and 0.73899785. The aspherical shape is obtained by applying a thin lacquer coating 79 of Diacryl having a thickness of 7 micrometer on the optical axis 77. The boundary surface 75 on the other side of the second lens 47 has an infinite radius of curvature.

For a correct optical effect of the lens system 39, the optical axes 73, 77 of the objective lens 45 and the auxiliary lens 47 must coincide within very small tolerances and be parallel, viewed perpendicularly to the optical axis 41 of the lens system 39. In accordance with the invention, said tolerances are achieved, in a manner which is not very time-consuming, in that the first mount 63 and the second mount 65 of the lens holder 61 are provided with, respectively, a first circular cylindrical inner wall 83 and a second circular cylindrical inner wall 85 having a common center line 87 that coincides with the optical axis 41, the first inner wall 83 having a diameter that is substantially equal to the first diameter $D_1$ and the second inner wall 85 having a diameter that is substantially equal to the second diameter $D_2$. Furthermore, the objective lens 45 and the auxiliary lens 47 comprise more than one half of, respectively, the first spherical lens body 67 and the second spherical lens body 69, i.e. viewed parallel to the optical axes 73 and 77, the height of the objective lens 45 and the auxiliary lens 47 exceeds $D_1/2$ and $D_2/2$, respectively. As a result, the objective lens 45 and the auxiliary lens 47 have a circular outline the diameter of which is equal to, respectively, $D_1$ and $D_2$, so that the objective lens 45 and the auxiliary lens 47 are accurately enclosed by, respectively, the first inner wall 83 and the second inner wall 85, viewed perpendicularly to the center line 87, and hence are accurately centered with respect to the center line 87 and with respect to one another. In the manufacture of the lens system 39, the inner walls 83 and 85 can be accurately provided in the lens holder 61 by means of a conventional tool, such as a lathe. Subsequently, first the auxiliary lens 47 is provided, and secured, in the second mount 65. In the example shown, the auxiliary lens 47 is secured in the second mount 65 by means of a press fit of the second spherical lens body 69 in the second inner wall 85. The auxiliary lens 47 may alternatively be differently secured in the second mount 65, for example by means of a glued joint. Subsequently, the objective lens 45 is provided in the first mount 63, so that the objective lens 45 is centered with respect to the auxiliary lens 47 in directions perpendicular to the centerline 87. The optical axis 73 of the objective lens 45 is subsequently aligned so as to be parallel to the optical axis 77 of the auxiliary lens 47 by means of an interferometric aligning process that is known per se and commonly applied. In this process, the objective lens 45 is tilted through a limited angle about a tilt axis extending perpendicularly to the center line 87 by means of a manipulator that is known per se and customarily used. As the objective lens 45 comprises more than half the spherical lens body 67, the objective lens remains completely in contact, during tilting, with the first inner wall 83, so that the accurate centration of the objective lens 45 and the auxiliary lens 47 with respect to each other in directions perpendicular to the center line 87 is not influenced during tilting the objective lens 45. The objective lens 45 is finally secured in the first mount 63 by means of a glued joint. As is also shown in FIG. 3, the first mount 63 and the second mount 65 of the lens holder 61 are substantially sleeve-shaped, the first mount 63 being provided with a ring-shaped flange 89 by means of which the lens holder 61 is secured to the first actuator 57. The sleeve-shaped mounts 63, 65 are connected to one another via a hollow, conical center portion 91, as a result of which the lens holder 61 has a very high rigidity and accuracy of form. By virtue thereof, the mutual positions of the objective lens 45 and the auxiliary lens 47 are substantially not influenced by accelerating forces.

Figure 4:
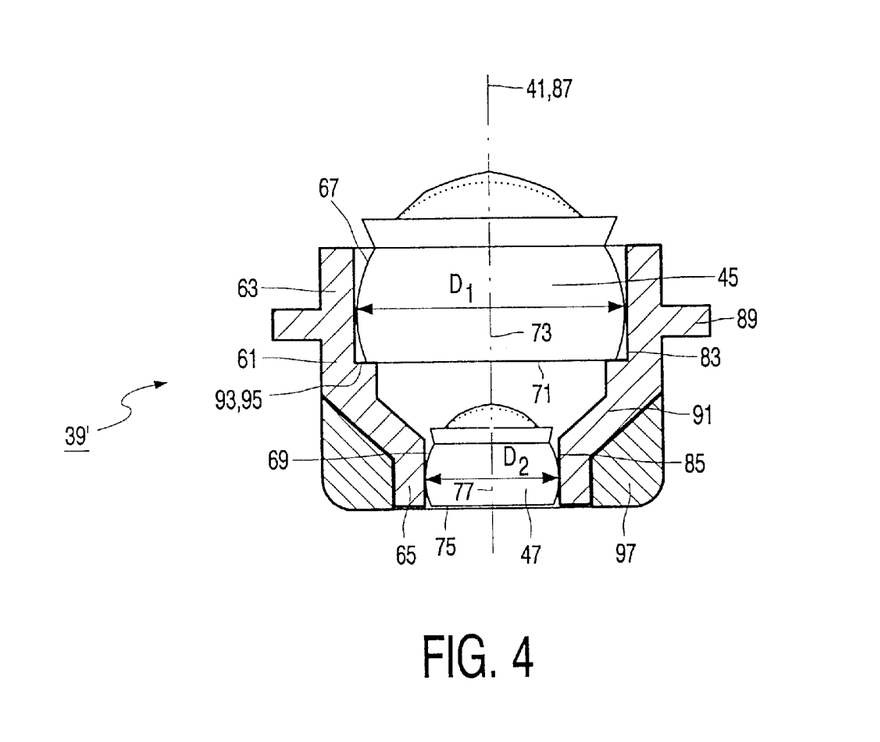

The second embodiment of a lens system 39' in accordance with the invention, as shown in FIG. 4, can also suitably be used in the scanning device 15 instead of the lens system 39 discussed hereinabove. In FIG. 4, parts of the lens system 39' that correspond to parts of the lens system 39 bear the same reference numerals. In the following part of this document, only several aspects of the lens system 39' that differ from the lens system 39 are discussed.

As shown in FIG. 4, the first mount 63 of the lens holder 61 of the lens system 39' is provided with an abutting member 93 for the boundary surface 71 of the objective lens 45. In the embodiment shown, the abutting member 93 comprises a ring-shaped surface 95, which extends perpendicularly to the center line 87 and connects the inner wall 83 and the outer wall 85 to one another in a stepwise manner. The abutting member 93 may alternatively be differently embodied, for example in the form of three abutting surfaces which each extend in a common imaginary plane at right angles to the center line 87. As the ring-shaped surface 95 extends perpendicularly to the center line 87, and the boundary surface 71 of the objective lens 45 abuts against the ring-shaped surface 95, the optical axis 73 of the objective lens 45 accurately extends parallel to the centerline 87. As FIG. 4 further shows, a ring-shaped body 97 is arranged around the second mount 65 and the conical central portion 91, which ring-shaped body is made from an elastic material, such as polyethylene, and serves as a bumper to preclude damage to the information carrier 9 caused by mechanical contact between the lens system 39' and the information carrier 9.

Figure 5:
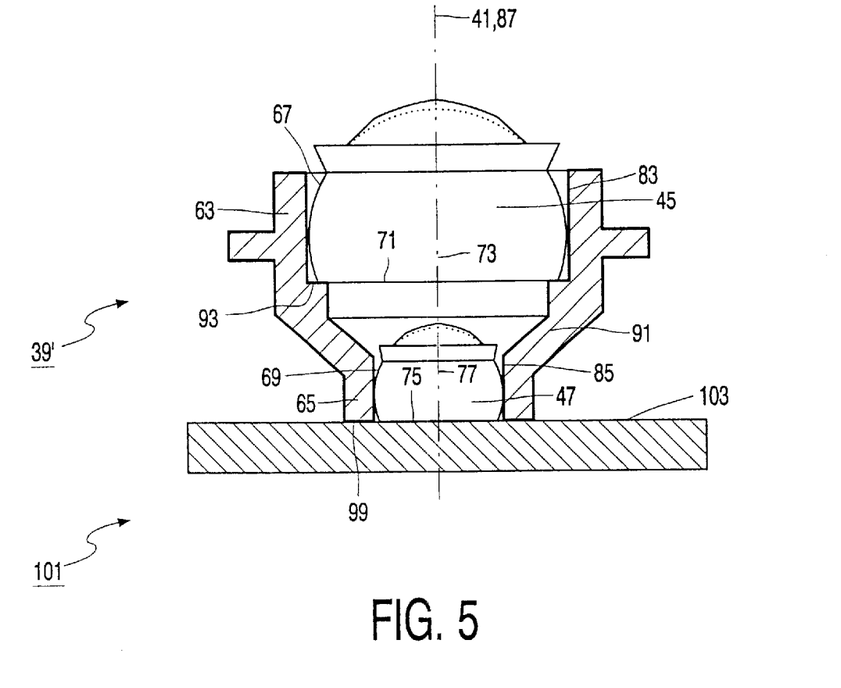

FIG. 5 diagrammatically shows how the auxiliary lens 47 of the lens system 39' shown in FIG. 4 is aligned with respect to the objective lens 45 in accordance with a method in accordance with the invention. As discussed hereinabove, the optical axis 73 of the objective lens 45 extends, in an accurate position, parallel to the center line 87 in that the boundary surface 71 of the objective lens 45 abuts against the abutting member extending perpendicularly to the center line 87. In accordance with the method shown in FIG. 5, the second mount 65 of the lens holder 61 is provided, on a side facing away from the objective lens 45, with a ring-shaped end surface 99 extending perpendicularly to the center line 87. The auxiliary lens 47 is positioned in the second mount 65 by means of an aligning tool 101 provided with a single aligning surface 103. The auxiliary lens 47 is positioned in the second mount 65 by simultaneously supporting the boundary surface 75 of the auxiliary lens 47 and the end surface 99 of the lens holder 61 by means of the aligning surface 103 of the aligning tool 101. As a result of the fact that the end surface 99 extends perpendicularly to the center line 87, the optical axis 77 of the auxiliary lens 47 is accurately positioned parallel to the center line 87 and hence accurately aligned with respect to the optical axis 73 of the objective lens 45. The boundary surface 75 of the auxiliary lens 47 and the end surface 99 of the lens holder 61 are thus situated in a common plane. The construction of the aligning tool 101 necessary in accordance with this method is very simple. Apart from said two circular cylindrical inner walls 83 and 85, the lens holder 61 must also be provided with the abutting member 93 extending perpendicularly to the center line 87 and with the end surface extending perpendicularly to the center line 87. The abutting member 93 and the end surface 99 can be accurately provided by means of conventional tools, such as a lathe, enabling the abutting member 93 and the two inner walls 83 and 85 to be provided in a single machining step. The required accuracy is thus obtained, in accordance with the method in accordance with the invention, in a manner which is not very laborious.

Figure 6:
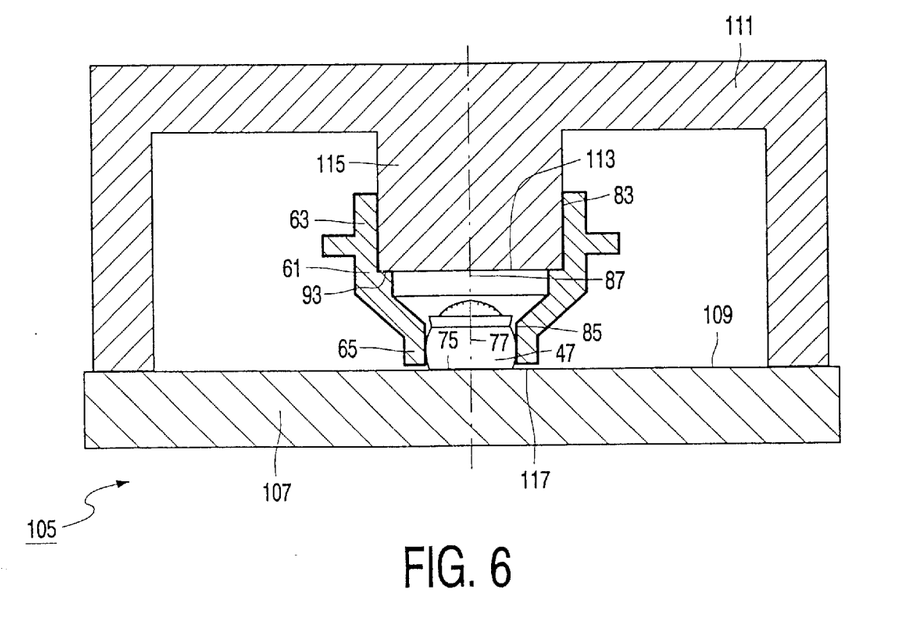

FIG. 6 finally shows in a diagrammatic view how the auxiliary lens 47 of the lens system 39' shown in FIG. 4 is aligned with respect to the center line 87 by means of an alternative method in accordance with the invention. In accordance with this alternative method, the auxiliary lens 47 is provided in the lens holder 61 prior to the objective lens 45. The auxiliary lens 47 is positioned in the second mount 65 by means of an aligning tool 105 which is provided with a first portion 107 having a first aligning surface 109 and a second portion 111 having a second aligning surface 113. The second aligning surface 113 is an end surface of a circular cylindrical mandrel 115 which forms part of the second portion 111. In an assembled state of the first portion 107 and the second portion 111 of the aligning tool 105, shown in FIG. 6, both aligning surfaces 109 and 113 run accurately parallel. In accordance with the alternative method, the first mount 63 of the lens holder 61 is placed over the mandrel 115, so that the abutting member 93 of the first mount 63 is supported by the second aligning surface 113. The auxiliary lens 47 is positioned in the second mount 65 by means of the first aligning surface 109, the boundary surface 75 of the auxiliary lens 47 being supported by said first aligning surface 109. In the assembled state of the aligning tool 105, shown in FIG. 6, there is a free space 117 between the first aligning surface 109 and the second mount 65, so that the position of the first aligning surface 109 with respect to the second aligning surface 113 is not influenced by the presence of the second mount 65. In this manner, the boundary surface 75 of the auxiliary lens 47 is accurately positioned so as to be parallel to the abutting member, so that the optical axis 77 of the auxiliary lens 47 is accurately aligned so as to be parallel to the center line 87. By subsequently positioning the boundary surface 71 of the objective lens 45 so as to abut against the abutting member 93, also the optical axis 73 of the objective lens 45 is accurately aligned so as to be parallel to the center line 87 and hence accurately aligned with respect to the optical axis 77 of the auxiliary lens 47. The construction of the aligning tool 105 required in accordance with this alternative method is less simple than that of the aligning tool 101 shown in FIG. 5. An advantage of the alternative method however resides in that, apart from the two circular cylindrical inner walls 83 and 84, the lens holder 61 only has to be provided with the abutting member 93 extending perpendicularly to the center line 87. The abutting member 93 and the inner walls 83, 85 can be accurately provided in a single process step by means of a conventional tool, such as a lathe, so that also the alternative method is not very time-consuming. In the assembled state of the aligning tool 105, shown in FIG. 6, the free space 117 is present between the first aligning surface 109 and the second mount 65, as a result of which the boundary surface 75 of the auxiliary lens 47 projects slightly beyond the second mount 65 after the manufacture of the lens system 39'. This can be precluded, for example, by providing the first portion 107 of the aligning tool 105 with a circular aligning surface that is raised with respect to the first alignment surface 109 and the diameter of which is smaller than the second diameter $D_2$ of the second mount 65, so that the boundary surface 75 is recessed in the second mount 65.

By means of the optical player in accordance with the invention, as described hereinabove, during scanning the information layer 13 of the information carrier 9, information present on the information layer 13 can be read or information can be written on the information layer 13. It is to be noted that the invention also relates to optical players which can be used exclusively to read information present on an information layer of an information carrier.

It is finally noted that the invention also includes embodiments wherein at least one of the two mounts 63, 65 of the lens holder 61 is provided with an inner wall which, unlike the examples discussed hereinabove, is not entirely circular cylindrical and, viewed parallel to the center line 87, not provided with a constant diameter, but which instead is only partly circular cylindrical or, viewed parallel to the center line 87, provided with a constant diameter for a limited distance. In such embodiments, the relevant lens is provided between the inner wall's circular cylindrical portion of constant diameter.

We claim:

1. An optical lens system comprising:
   a first lens comprising a more than half part of a substantially spherical first lens body having a first diameter and a substantially flat first boundary surface;
   a second lens comprising a more than half part of a substantially spherical second lens body having a second diameter and a substantially flat second boundary surface, the second diameter being smaller than the first diameter; and
   a lens holder comprising a first and a second mount for, respectively, the first and the second lens, wherein the first and the second mounts comprise, respectively, a first and a second circular cylindrical inner wall having a common center line, a diameter of the first inner wall and a diameter of the second inner wall being substantially equal to, respectively, the first and the second diameters.

2. The optical lens system of claim 1, wherein the first boundary surface faces the second lens, and the first boundary surface extends perpendicularly to the center line and wherein the first mount is provided with an abutting member for the first boundary surface, the abutting member extending in a plane perpendicular to the center line.

3. The optical lens system of claim 2, wherein the abutting member comprises a ring-shaped surface extending perpendicularly to the center line, which ring-shaped surface causes the first and the second inner wall to be connected to one another in a stepwise manner.

4. The optical lens system of claim 2, wherein the second boundary surface faces away from the first lens and wherein the second boundary surface extends perpendicular to the center line.

5. The optical lens system of claim 2, wherein the second mount is provided, on a side facing away from the first lens, with an end surface extending perpendicularly to the center line, the end surface and the second boundary surface being situated in a common plane.

6. The optical lens system of claim 1, wherein at least one of the first and second lenses is secured in the corresponding first or second mount by means of a glued joint.

7. The optical lens system of claim 1, wherein at least one of the first and second lenses is secured in the corresponding first or second mount by press-fitting the first or second lens body in the corresponding first or second inner wall.

8. The optical lens system of claim 1, wherein the first and second mount are substantially sleeve-shaped and connected to one another via a hollow conical center portion of the lens holder.

9. A method of manufacturing an optical lens system comprising:
   providing a first lens comprising a more than half part of a substantially spherical first lens body having a first diameter and a substantially flat first boundary surface;
   providing a second lens comprising a more than half part of a substantially spherical second lens body having a second diameter and a substantially flat second boundary surface, the second diameter being smaller than the first diameter;
   providing a lens holder comprising a first and second mount for, respectively, the first and the second lens, wherein the first and the second mounts comprise, respectively, a first and a second circular cylindrical inner wall having a common center line, a diameter of the first inner wall and a diameter of the second inner wall being substantially equal to, respectively, the first and the second diameters;
   wherein the first boundary surface faces the second lens, and the first boundary surface extends perpendicularly to the center line and wherein the first mount is provided with an abutting member for the first boundary surface, the abutting member extending in a plane perpendicular to the center line;
   wherein the second boundary surface faces away from the first lens and wherein the second boundary surface extends perpendicular to the center line; and
   positioning the second lens in the second mount by supporting the boundary surface of the second lens by means of a first aligning surface of an aligning tool, and by simultaneously supporting the abutting member of the first mount by means of a second aligning surface of the aligning tool that is directed parallel to the first aligning surface.

10. A method of manufacturing an optical lens system comprising:
    providing a first lens comprising a more than half part of a substantially spherical first lens body having a first diameter and a substantially flat first boundary surface;
    providing a second lens comprising a more than half part of a substantially spherical second lens body having a second diameter and a substantially flat second boundary surface, the second diameter being smaller than the first diameter;
    providing a lens holder comprising a first and a second mount for, respectively, the first and the second lens, wherein the first and the second mounts comprise, respectively, a first and a second circular cylindrical inner wall having a common center line, a diameter of the first inner wall and a diameter of the second inner wall being substantially equal to, respectively, the first and the second diameters;
    wherein the first boundary surface faces the second lens, and the first boundary surface extends perpendicularly to the center line and wherein the first mount is provided with an abutting member for the first boundary surface, the abutting member extending in a plane perpendicular to the center line;
    wherein the second mount is provided, on a side facing away from the first lens, with an end surface extending perpendicularly to the center line, the end surface and the second boundary surface being situated in a common plane; and
    positioning the second lens in the second mount by simultaneously supporting the boundary surface of the second lens and the end surface of the second mount by means of an aligning surface of an aligning tool.

11. An optical scanning device for scanning an information layer of an optically scannable information carrier comprising;
   a radiation source; and
   an optical lens system having an optical axis for focussing a radiation beam supplied, in operation, by the radiation source to a scanning spot on the information layer, the lens system comprising:
   a first lens comprising a more than half part of a substantially spherical first lens body having a first diameter and a substantially flat first boundary surface;
   a second lens comprising a more than half part of a substantially spherical second lens body having a second diameter and a substantially flat second boundary surface, the second diameter being smaller than the first diameter; and
   a lens holder comprising a first and a second mount for, respectively, the first and the second lens in fixed positions, wherein the first and second mounts comprise, respectively, a first and a second circular cylindrical inner wall having a common center line, a diameter of the first inner wall and a diameter of the second inner wall being substantially equal to, respectively, the first and the second diameters.

12. An optical player comprising:
   a table which can be rotated about an axis of rotation;
   an optical scanning device for scanning an information layer of an optically scannable information carrier which can be placed on the table; and
   means for displacing an optical lens system of the scanning device in a direction perpendicular to the axis of rotation, the lens system comprising:
   a first lens comprising a more than half part of a substantially spherical first lens body having a first diameter and a substantially flat first boundary surface;
   a second lens comprising a more than half part of a substantially spherical second lens body having a second diameter and a substantially flat second boundary surface, the second diameter being smaller than the first diameter; and
   a lens holder comprising a first and a second mount for, respectively, the first and the second lens in fixed positions, wherein the first and the second mounts comprise, respectively, a first and a second circular cylindrical inner wall having a common center line, a diameter of the first inner wall and a diameter of the second inner wall being substantially equal to, respectively, the first and second diameters.

13. The optical scanning device of claim 11, wherein the first boundary surface faces the second lens, and the first boundary surface extends perpendicularly to the center line and wherein the first mount is provided with an abutting member for the first boundary surface, the abutting member extending in a plane perpendicular to the center line.

14. The optical scanning device of claim 13, wherein the abutting member comprises a ring-shaped surface extending perpendicular to the center line, which ring-shaped surface causes the first and the second inner wall to be connected to one another in a stepwise manner.

15. The optical scanning device of claim 13, wherein the second boundary surface faces away from the first lens and wherein the second boundary surface extends perpendicular to the center line.

16. The optical scanning device of claim 13, wherein the second mount is provided, on a side facing away from the first lens, with an end surface extending perpendicularly to the center line, the end surface and the second boundary surface being situated in a common plane.

17. The optical scanning device of claim 11, wherein at least one of the first and second lenses is secured in the corresponding first or second mount by means of a glued joint.

18. The optical scanning device of claim 11, wherein at least one of the first and second lenses is secured in the corresponding first or second mount by press-fitting the first or second lens body in the corresponding first or second inner wall.

19. The optical scanning device of claim 11, wherein the first and the second mount are substantially sleeve-shaped and connected to one another via a hollow conical center portion of the lens holder.

20. The optical player of claim 12, wherein the first boundary surface faces the second lens, and the first boundary surface extends perpendicularly to the center line and wherein the first mount is provided with an abutting member for the first boundary surface, the abutting member extending in a plane perpendicular to the center line.

21. The optical player of claim 20, wherein the abutting member comprises a ring-shaped surface extending perpendicular to the center line, which ring-shaped surface causes the first and the second inner wall to be connected to one another in a stepwise manner.

22. The optical player of claim 20, wherein the second boundary surface faces away from the first lens and wherein the second boundary surface extends perpendicular to the center line.

23. The optical player of claim 20, wherein the second mount is provided, on a side facing away from the first lens, with an end surface extending perpendicularly to the center line, the end surface and the second boundary surface being situated in a common plane.

24. The optical player of claim 12, wherein at least one of the first and second lenses is secured in the corresponding first or second mount by means of a glued joint.

25. The optical player of claim 12, wherein at least one of the first and second lenses is secured in the corresponding first or second mount by press-fitting the first or second lens body in the corresponding first or second inner wall.

26. The optical player of claim 12, wherein the first and the second mount are substantially sleeve-shaped and connected to one another via a hollow conical center portion of the lens holder.

* * * * *